Feb. 6, 1962 W. MILLAR 3,019,656
PRESSURE GAUGES
Filed April 22, 1957 2 Sheets-Sheet 1

WILLIAM MILLAR
Inventor
Attorneys

Feb. 6, 1962 W. MILLAR 3,019,656
PRESSURE GAUGES
Filed April 22, 1957 2 Sheets-Sheet 2
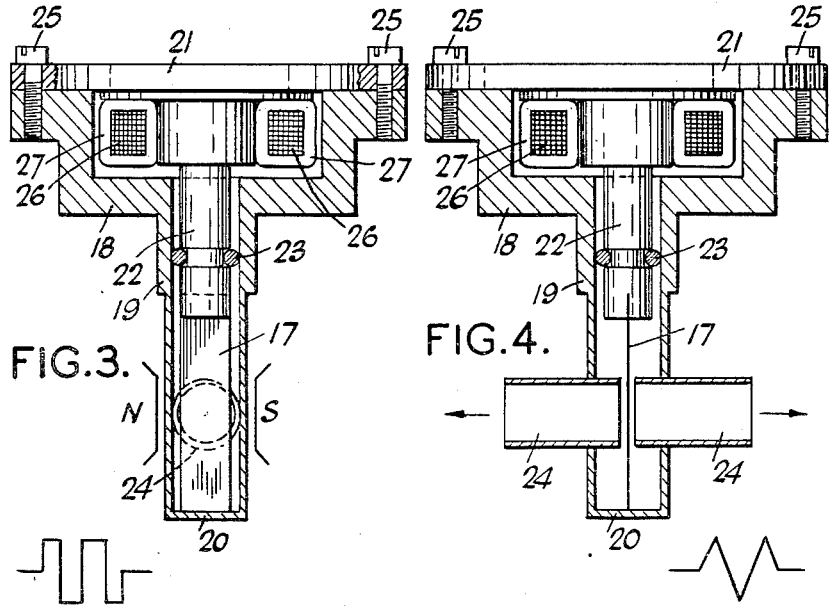
FIG.3.
FIG.4.
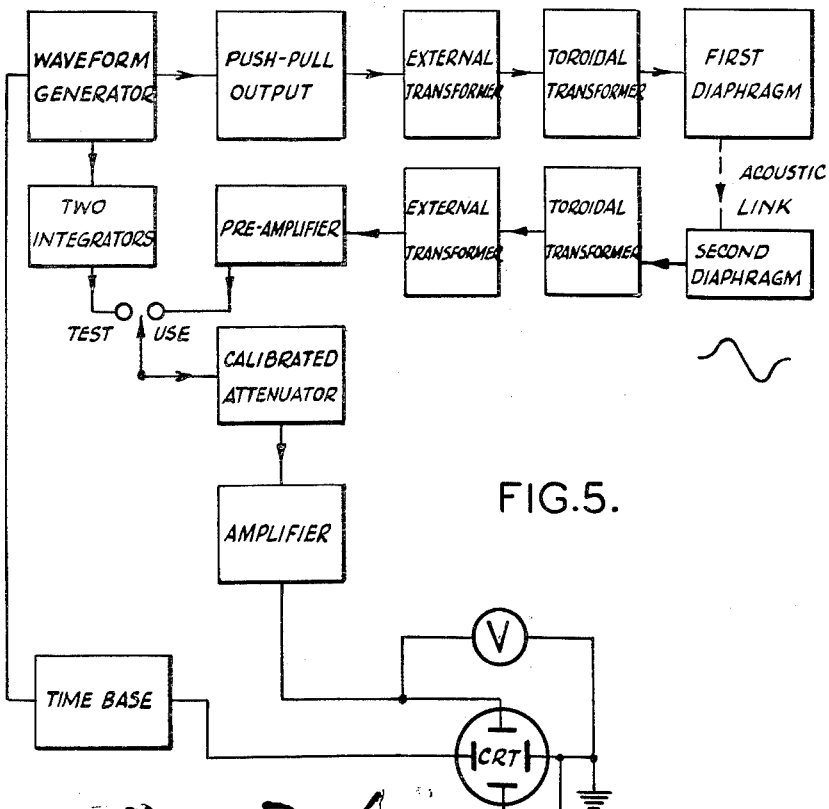
FIG.5.
WILLIAM MILLAR
Inventor
Attorneys United States Patent Office 3,019,656
Patented Feb. 6, 1962

3,019,656
PRESSURE GAUGES
William Millar, Abingdon, England, assignor to The United Kingdom Atomic Energy Authority Patents Branch, London, England
Filed Apr. 22, 1957, Ser. No. 654,285
Claims priority, application Great Britain Apr. 20, 1956
8 Claims. (Cl. 73—398)

This invention relates to pressure gauges for measuring gas pressure.

Known gauges for measuring gas pressure within the range $10^{-2}$ to $10^{-3}$ mm. of mercury include manometers, McLeod gauges, Pirani gauges and comparison devices using a mechanical diaphragm. Each of these has its own limitations in convenience, accuracy, or working range.

An object of this invention is to provide a gauge in which these limitations are minimised, and in which a large range of pressure can be covered by one gauge.

According to the present invention a pressure gauge comprises an electromagnetic acoustic transmitter and an electromagnetic acoustic receiver, said transmitter and receiver each including a thin electrically conducting diaphragm adapted to be energised in the presence of a magnetic field by an electric current flowing in the diaphragm, two tubes connected between said transmitter and receiver with their axes normal to the said diaphragms adapted when gas-filled to form equal-length acoustic transmission lines between each side of the transmitter diaphragm and a corresponding side of the receiver diaphragm, means for admitting into said tubes a gas whose pressure is to be measured, means for energising the transmitter diaphragm whereby an acoustic signal is injected into said transmission lines and means for measuring the voltage induced in the receiver diaphragm by said signal, whereby the pressure may be measured by measuring the attenuation of the acoustic signal in the transmission lines.

In order to enable the nature of the invention to be more readily understood, reference is directed to the accompanying drawings illustrating by way of example a practical embodiment of the invention.

In these drawings,

FIG. 3 shows a central longitudinal section of a transmitter or receiver particularly for use with the embodiment of FIG. 2.

FIG. 4 is a view similar to FIG. 3, but with the plane of the section taken at right angles to that of FIG. 3.

FIG. 5 is a block schematic diagram illustrating a preferred form of the invention.

Figure 1:
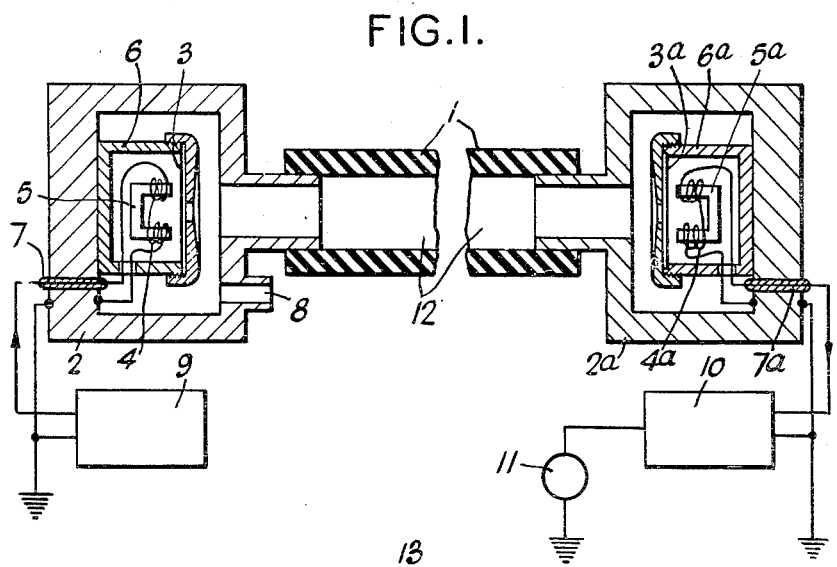
FIG. 1 is a central longitudinal section of a simple form of acoustic pressure gauge.

In FIG. 1, which illustrates a simple form of gauge, 1 is a tube containing the gas 12 whose pressure is to be measured. Sealed to each end of the tube are metal cases 2 and 2a containing respectively the transmitter and receiver assemblies. These assemblies are identical and consist of magnetisable metallic diaphragms 3 and 3a attached to mountings 6 and 6a. Within these mountings are fixed electromagnets 5 and 5a having windings 4 and 4a. The cases 2 and 2a are gas tight but case 2 has an opening 8 for admitting gas to the system. Signal generator 9 is connected to winding 4 through sealed insulated bush 7, and amplifier 10 to winding 4a through similar bush 7a. Voltmeter 11 measures the amplifier output.

The gas 12 within the tube 1 constitutes an acoustic transmission line between transmitter diaphragm 3 and receiver diaphragm 3a. To avoid acoustic transmission along the walls of the tube itself, the latter is made of some material such as rubber which is a poor conductor of sound, but a metallic tube could be used if the acoustic transmission along it were reduced by suitable design.

When diaphragm 3 is excited by signal generator 9 a signal travels through the gas and excites diaphragm 3a. A signal is thus induced in winding 4a and is amplified in amplifier 10, the output being read on voltmeter 11. As the acoustic transmission through a gas depends on the pressure, the amplitude of movement of diaphragm 3a for a constant amplitude of movement of diaphragm 3 will vary with the pressure of the gas 12. Hence the signal induced in winding 4a and the reading on voltmeter 11 will depend on the pressure of the gas 12. By suitable design the transmission-pressure relationship may be made linear over a wide range. The voltmeter 11 may be calibrated in units of pressure.

Figure 2:
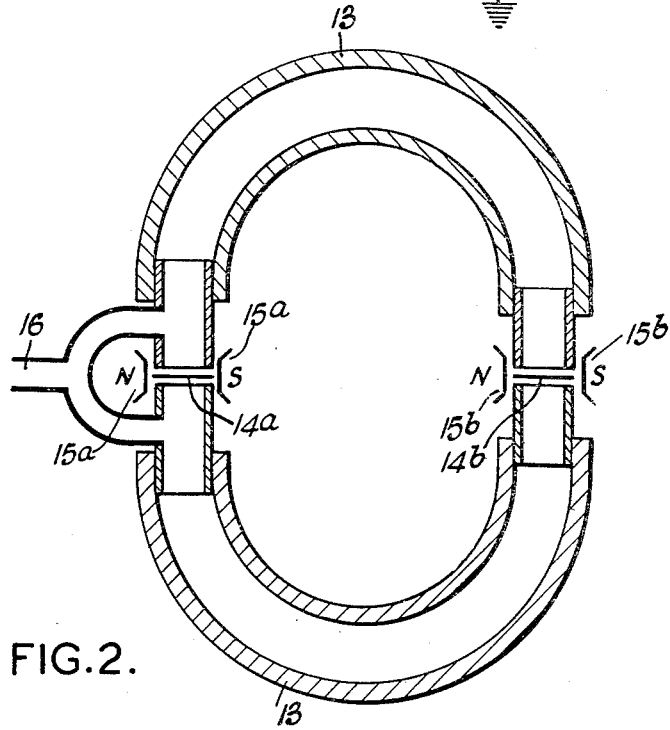
FIG. 2 is a diagrammatic central longitudinal section of a transmission line arrangement with acoustic transmitter and receiver forming part of a gauge according to the present invention.

In FIG. 2 tube 13 is continuous and provides two paths of equal length between transmitter diaphragm 14a and receiver diaphragm 14b. Both faces of the diaphragm are thus used to transmit and receive the signal. In this case the diaphragms are not magnetisable but electrically conducting. Magnets 15a and 15b produce magnetic fields in a direction parallel to the line of intersection of the plane of the drawing and the plane of the diaphragms. Current flowing through diaphragm 14a in a direction perpendicular to the plane of the drawing causes excitation by electromagnetic induction. Similarly the voltage induced in diaphragm 14b when excited by an acoustic signal is in a direction perpendicular to the plane of the drawing. A gas inlet 16 to both halves of the tube is provided, so that acoustic noise entering via the inlet is transmitted along the two equal paths and balances out at the receiver diaphragm.

FIGS. 3 and 4 illustrate a receiver or transmitter suitable for use with the tube shown in FIG. 2.

A cylindrical copper case 18 has a tubular extension 19 terminated by a circular copper plate 20. The copper lid 21 secured by bolts 25 has a cylindrical extension 22. The diaphragm 17 of 0.0015 in. copper is fastened between the end of extension 22 and plate 20. An O-ring seal 23 is provided between extension 19 and 22. Connection is made to tube 13 of FIG. 2 by pipes 24. The core 26 of a toroidal transformer having a primary winding 27 surrounds extension 22. The copper circuit formed by case 18, extension 19, plate 20, diaphragm 17, extension 22 and lid 21 constitutes a single-turn secondary winding on the transformer, the coaxial construction minimising electromagnetic coupling between transmitter and receiver. The signal is fed to the primary winding 27 when the device is used as a transmitter and taken from the primary winding when the device is used as a receiver.

The gauge may be operated using either continuous sinusoidal or pulse signals. The use of continuous sinusoidal signals simplifies the associated electronic circuits but has the disadvantage that the nature of the gas must be known and the frequency adjusted accordingly to obtain accurate results. This is because it is undesirable to operate at such a frequency that the acoustic transmission line is of near resonant length (i.e. approximately an integral number of half-wavelengths) with the particular gas composition being measured. In a resonant condition the system is firstly very frequency-sensitive and therefore gas composition-sensitive, and secondly, because the system at resonance cannot in practise have infinite or zero impedance, the transmission is determined by viscous forces in the gas and in the diaphragms.

In a preferred method of pulse operation the current pulse applied to the transmitter diaphragm is a waveform of such shape that the diaphragms of the transmitter and receiver are not permitted to oscillate mechanically after the end of the pulse, but are displaced from and restored to their rest positions by the pulse. It can be shown that the velocity waveform of the transmitter diaphragm is the integral of the current pulse waveform, and that the velocity waveform of the receiver diaphragm is the integral of the velocity waveform of the transmitter diaphragm. It can hence be demonstrated that, to prevent the aforementioned oscillation of the diaphragms, the shape of the current pulse waveform must be such that the mean values of the first and second time integrals taken over the duration of the pulse are both zero, the duration of the pulse being short compared with the natural period of the diaphragm. With this method of operation the nature of the gas need not be known, but to achieve greater accuracy the answer may be multiplied by a correction factor consisting of the ratio of the velocity of sound in the gas being measured to that for which the output meter is calibrated. Pulse operation enables this factor to be readily determined.

FIG. 5 illustrates this pulse method of operation. The waveform generator provides a train of current pulses of the shape shown, consisting of the following four square-topped portions of equal amplitude (a) a positive-going portion of length $t$ say, (b) a negative-going portion of length $(1+\sqrt{2})t$, (c) a positive-going portion of length $(1+\sqrt{2})t$ and (d) a negative-going portion of length $t$. This current pulse waveform, which can be shown to satisfy the aforementioned time-integral condition excites in the first (transmitter) diaphragm the velocity waveform shown, which is the first integral of the current pulse waveform. An acoustic pulse of this form is transmitted through the gas and excites in the second (receiver) diaphragm the second velocity waveform shown, which is the second integral of the current pulse waveform. This latter waveform is also that of the voltage produced across the receiver diaphragm. The diaphragm displacement waveforms are the integrals of their velocity waveforms; hence the receiver diaphragm is displaced from and restored to its rest position once per pulse and the transmitter diaphragm twice per pulse (once in each direction). A calibrated attenuator is included between receiver and amplifier to enable the gauge to cover a wide range of pressures. The peak voltmeter, V, may be calibrated directly in units of pressure for a standard gas, for example air.

The received signal is also fed to the Y-plates of a cathode ray tube, CRT, whose time base is triggered by the waveform generator. This enables the velocity of the pulse in the gas to be determined and the correction factor obtained.

The double integrator produces a signal simulating the output from the receiver for checking the operation of the gauge.

I claim:
1. A pressure gauge comprising an electromagnetic acoustic transmitter and an electromagnetic acoustic receiver, said transmitter and receiver each including a thin electrically conducting diaphragm adapted to be energised in the presence of a magnetic field by an electric current flowing in the diaphragm, two tubes connected between said transmitter and receiver with their axes normal to the said diaphragms adapted when gas-filled to form equal-length acoustic transmission lines between each side of the transmitter diaphragm and a corresponding side of the receiver diaphragm, means for admitting into said tubes a gas whose pressure is to be measured, means for energising the transmitter diaphragm whereby an acoustic signal is injected into said transmission lines and means for measuring the voltage induced in the receiver diaphragm by said signal, whereby the pressure may be measured by measuring the attenuation of the acoustic signal in the transmission lines.

2. A pressure gauge as claimed in claim 1 wherein the energising means provide a current pulse of such shape that the transmitter and receiver diaphragms are displaced from and restored to their rest positions by the pulse.

3. A pressure gauge as claimed in claim 2 comprising cathode-ray tube means for measuring the time taken for the signal to travel from transmitter to receiver.

4. A pressure gauge as claimed in claim 2 wherein said current pulse consists of consecutive square-topped portions of equal amplitude, as follows:
 (1) A portion of duration $t$ of one polarity.
 (2) A portion of duration $(1+\sqrt{2})t$ of the opposite polarity.
 (3) A portion of duration $(1+\sqrt{2})t$ of the said one polarity.
 (4) A portion of duration $t$ of the said opposite polarity.

5. A pressure gauge as claimed in claim 1 wherein the said transmitter and receiver each comprise a transformer and the said diaphragm is connected in series with a single-turn secondary winding of said transformer.

6. A pressure gauge as claimed in claim 5 wherein said transformer has a toroidal core, said core being contained in a case having electrically conducting walls and an extension normal to the plane of the core, said diaphragm being mounted coaxially within said extension, said extension having ports in the wall thereof opposite each side of said diaphragm adapted to connect with said tubes and said diaphragm forming in series with the walls of said case and of said extension the said single-turn secondary winding, whereby electromagnetic coupling between transmitter and receiver is minimised.

7. A pressure gauge as claimed in claim 1 wherein the energising means provides a continuous sinusoidal current.

8. A transmitter or receiver for a pressure gauge comprising an electrically conductive elongate casing having a pair of oppositely disposed lateral ports adjacent one end wall thereof, a conductive member extending longitudinally within the casing from the other end wall thereof toward the pair of ports, a toroidal transformer core mounted in the casing about the conductive member and having a primary winding thereon, and a conductive diaphragm extending coaxially within the casing between the ports and secured to the conductive member and said one end wall of the casing to complete a single-turn secondary winding for the core.

References Cited in the file of this patent

UNITED STATES PATENTS

| 2,403,999 | Read et al. | July 16, 1946 |
| 2,800,796 | Westcott et al. | July 30, 1957 |
| 2,874,564 | Martin et al. | Feb. 24, 1959 |

FOREIGN PATENTS

| 727,891 | Great Britain | Apr. 13, 1955 |
| 825,177 | Germany | Dec. 17, 1951 |